(12) United States Patent
Asare-Addo

(10) Patent No.: US 12,320,737 B2
(45) Date of Patent: Jun. 3, 2025

(54) MEMBRANE PERMEATION DEVICE AND CORRESPONDING METHOD

(71) Applicant: UNIVERSITY OF HUDDERSFIELD, Yorkshire (GB)

(72) Inventor: Kofi Asare-Addo, Yorkshire (GB)

(73) Assignee: UNIVERSITY OF HUDDERSFIELD (GB)

( * ) Notice: Subject to any disclaimer, the term of this patent is extended or adjusted under 35 U.S.C. 154(b) by 260 days.

(21) Appl. No.: 17/753,992

(22) PCT Filed: Sep. 23, 2020

(86) PCT No.: PCT/GB2020/052297
§ 371 (c)(1),
(2) Date: Mar. 21, 2022

(87) PCT Pub. No.: WO2021/058948
PCT Pub. Date: Apr. 1, 2021

(65) Prior Publication Data
US 2023/0341310 A1    Oct. 26, 2023

(30) Foreign Application Priority Data
Sep. 23, 2019   (GB) ..................................... 1913709

(51) Int. Cl.
*G01N 15/08*   (2006.01)
*G01N 13/00*   (2006.01)
(Continued)

(52) U.S. Cl.
CPC ......... *G01N 15/0806* (2013.01); *G01N 13/00* (2013.01); *G01N 2013/003* (2013.01);
(Continued)

(58) Field of Classification Search
CPC ............. G01N 13/00; G01N 2013/003; G01N 2013/006; G01N 15/08; G01N 15/0806;
(Continued)

(56) References Cited

U.S. PATENT DOCUMENTS

| 2007/0205155 A1* | 9/2007 | Babcock ............. B01L 3/50255 422/534 |
| 2016/0139020 A1 | 5/2016 | Nicolas et al. |
| 2017/0176314 A1* | 6/2017 | Goodall ............. G01N 15/0806 |

OTHER PUBLICATIONS

Fazili et al., "Design and development of a novel fused filament fabrication (FFF) 3D printed diffusion cell with UV imaging capabilities to characterise permeation in pharmaceutical formulations," European Journal of Pharmaceutics and Biopharmaceutics, 2020, vol. 152, pp. 1-22.
International Search Report in PCT/GB2020/052297, mailed Nov. 30, 2020, 5 pages.
Kuentz, M., "Analytical technologies for real-time drug dissolution and precipitation testing on a small scale," Journal of Pharmacy and Pharmacology, 2014, vol. 67, pp. 143-159.
(Continued)

*Primary Examiner* — Nathaniel J Kolb
(74) *Attorney, Agent, or Firm* — Dickinson Wright PLLC

(57) ABSTRACT

A device suitable for measuring or quantifying the permeation or diffusion of one or more substances through a membrane, said device including a housing at least part of which is configured to form a first chamber or cell capable of holding a fluid or liquid in use, and a membrane support means to hold or locate at least one membrane in use adjacent to said first chamber or cell, wherein the first chamber or cell includes one or more windows or orifices through which ultraviolet (UV), visible (VIS) and/or infrared (IR) electromagnetic radiation can pass.

9 Claims, 10 Drawing Sheets

(51) Int. Cl.
    *G01N 21/03*        (2006.01)
    *G01N 35/00*        (2006.01)
(52) U.S. Cl.
    CPC ............... *G01N 2013/006* (2013.01); *G01N 2015/0846* (2013.01); *G01N 2015/086* (2013.01); *G01N 2021/0385* (2013.01); *G01N 2021/0389* (2013.01); *G01N 2035/00198* (2013.01)
(58) Field of Classification Search
    CPC ..... G01N 2015/0846; G01N 2015/086; G01N 2021/0385; G01N 2021/0389
    See application file for complete search history.

(56) References Cited

OTHER PUBLICATIONS

Sil et al., "3D-printed Franz type diffusion cells," International Journal of Cosmetic Science, 2018, vol. 40, No. 6, 13 pages.
Suarato et al., "3D-Printed, Pocket-Size Diffusion Cells for Skin Permeation Investigation," Proceedings, 2018, vol. 2, No. 945, pp. 1-5.
Written Opinion in PCT/GB2020/052297, mailed Nov. 30, 2020, 8 pages.

* cited by examiner

MEMBRANE PERMEATION DEVICE AND CORRESPONDING METHOD

The present invention relates to a device and method of using such a device for measuring the permeation or diffusion of substances across a membrane.

Although the present description refers to the quantification of diffusion and/or permeation across silicone membranes, the skilled person will appreciate that the device can be used with various membranes, such as skin and synthetic skin membranes, and is not limited to silicone membranes.

It is known to utilise techniques and apparatus such as static diffusion cells (Franz cells) and flow-through diffusion cells (Bronaugh cells) to measure the permeation or diffusion across a membrane. The Franz Cell apparatus comprises two chambers arranged vertically that are separated by a membrane.

The substance under test is applied to the membrane via the top chamber. The bottom chamber contains fluid from which samples are taken at regular intervals for analysis to determine the amount of substance that has permeated the membrane at the set time points.

Bronaugh cells are similar to Franz cells but use a flow-through system beneath the membrane layer and samples of the liquid below are taken continuously rather than at set time points.

The existing devices and apparatus have the disadvantages that real time monitoring is not available, therefore analysis takes a considerable amount of time.

It is therefore an aim of the present invention to provide an apparatus that addresses the abovementioned problems.

It is a further aim of the present invention to provide a method of using an apparatus that addresses the abovementioned problems.

In a first aspect of the invention there is provided a device or apparatus suitable for measuring or quantifying the permeation or diffusion of one or more substances through a membrane, said device including a housing at least part of which is configured to form a first chamber or cell capable of holding a fluid or liquid in use, and a membrane support means to hold or locate at least one membrane in use adjacent to said first chamber or cell, characterised in that the first chamber or cell includes one or more windows or orifices through which ultraviolet (UV), visible (VIS) and/or infrared (IR) electromagnetic radiation can pass.

As such, the device thereby provides a means for imaging and/or spectroscopic analysis of the contents of the first cell and/or the substances which have permeated and/or diffused across the membrane.

Typically the membrane support means is adapted to receive and/or hold at least one membrane in use. Further typically said membrane support means is located substantially towards the top or substantially at the top of said first chamber or cell.

In one embodiment the membrane support means is a plate or surface with one or more apertures through the same. As such, as a sample is introduced onto the membrane the one or more compounds of interest permeate through the membrane into the fluid in the first cell and are exposed to the electromagnetic radiation.

In one embodiment the membrane support means is located substantially between the first chamber or cell and a second chamber or cell. Typically the first chamber or cell forms a bottom compartment member underneath the membrane support means and a second chamber or cell forms a top compartment member. Further typically the second chamber or cell contains the sample undergoing analysis.

Typically the first chamber or cell contains fluid or solvent.

In one embodiment at least part of said bottom compartment member includes one or more walls. Typically at least part of said one or more walls is substantially transparent to ultraviolet (UV), visible (VIS), UV-VIS and/or near-infrared wavelengths of electromagnetic radiation.

Preferably the at least part of one of more walls contains a window. Typically the windows permits the transmission of light at the UV and/or UV-VIS part of the spectrum.

Typically the one or more orifices, windows, walls or parts thereof are transparent in one or more regions covering a spectral range from 190 nm to 1100 nm.

Preferably the device includes two windows or orifices. Typically the windows or orifices are parallel to each other on opposite sides of the bottom compartment member, such that the electromagnetic radiation can pass through the cell and importantly the contents of the cell.

In one embodiment the membrane support means substantially divides or partitions the housing into the first cell or chamber and the second cell or chamber.

In a preferred embodiment the membrane support means is positioned or located substantially transverse or at a right angle to at least one window or orifice. Typically the membrane support means is positioned or located such that the contents of the first chamber (the fluid) and the contents of the second chamber (the sample) can be viewed, imaged and/or analysed at the same time or substantially simultaneously.

In one embodiment the first cell and the second cell are substantially vertically aligned with the membrane located between the two. Typically this arrangement enables the sample and the contents of the first chamber to be imaged and/or analysed simultaneously.

Typically a detector means is located at and/or adjacent to one of the orifices or windows.

In one embodiment the detector is a UV-VIS detector or imager. Typically the detector is a CMOS detector.

Typically the device is placed in an UV imager.

In one embodiment the device is configured and/or orientated such that the interface between the membrane and first chamber or cell and the interface between membrane and sample is the second chamber or cell is aligned in a straight path between source and detector.

In one embodiment the first cell or chamber includes a stirrer means. Typically the stirrer means includes a magnetic stirrer bar located inside the first cell in use.

In one embodiment the device includes a dosage means. Typically the dosage means is a tube or other container into which the sample to be analysed is placed. Further typically the dosage means is positioned or sits on top of the membrane and prevents the sample from spreading across the same.

Preferably the dosage means is transparent to at least UV radiation.

In one embodiment the dosage means is a quartz tube.

In one embodiment the windows are fused silica quartz.

In one embodiment the device sits inside a Franz cell.

In one embodiment the device includes a membrane aligner. Typically the aligner is used with the support means to ensure the membrane is located substantially centrally in the device.

In a second aspect of the invention there is a method of analysing and/or imaging a sample wherein said sample is placed in a device, said device including a housing at least part of which is configured to form a first chamber or cell capable of holding a fluid or liquid in use, and a membrane support means to hold or locate at least one membrane in use adjacent to said first chamber or cell, characterised in that the first chamber or cell includes one or more windows or orifices through which ultraviolet (UV), visible (VIS) or infrared (IR) electromagnetic radiation can pass, said method including the step of introducing a sample onto the membrane and a solvent or fluid to the first cell.

In a third aspect of the invention there is provided a device for imaging a sample and/or for use with or within an imaging apparatus, said device including a housing including one or more walls and at least one window or aperture formed therein, said device including a membrane support means which at least partially divides the space defined within the housing walls into upper and lower two chambers or cells, characterised in that the window or aperture allows the transmission and/or is transparent to electromagnetic radiation.

Typically the electromagnetic radiation is around the UV, UV-VIS and/or infra-red part of the spectrum.

Specific embodiments of the invention are now described with reference to the following figures wherein.

The present invention provides an apparatus to image the permeation of a sample through a membrane, said apparatus adapted to be placed in a UV imager or similar apparatus.

Figure 1:
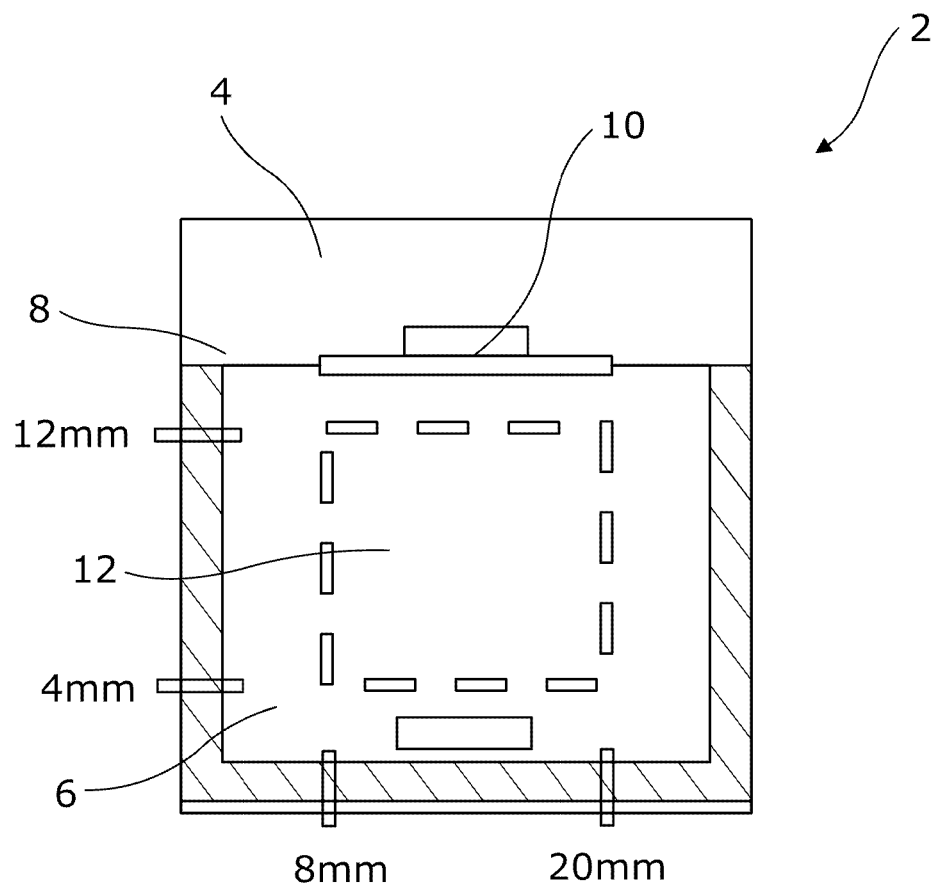
FIG. 1 shows a line drawing of a permeation cell in accordance with one embodiment of the invention.

Turning to FIG. 1 where there is shown a permeation cell 2 in accordance with one embodiment of the invention. The cell 2 is divided into upper 4 and lower 6 chambers by a membrane support plate 8 and membrane 10 located thereon and covering an aperture in the support plate between the upper and lower chambers. The sample, in this example Ketoprofen gel, is located on the membrane 10 and the lower chamber 6 filled with solvent. The cell 2 is located between a UV light source and a detector/imager such that as the Ketoprofen permeates through the membrane the permeation can be imaged and measured as shown in FIG. 2, through the quartz windows 12, 14.

Figure 2A:
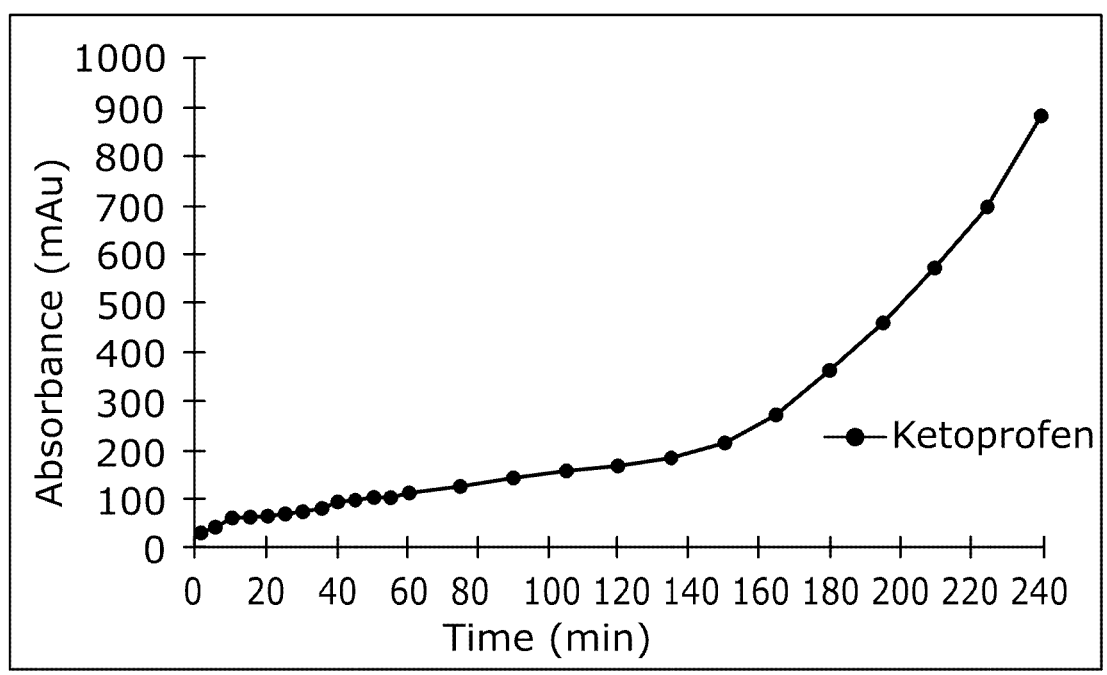
FIGS. 2a and 2b show an absorbance plot over time and absorbance images respectively using a cell in accordance with the invention.
Figure 2B:
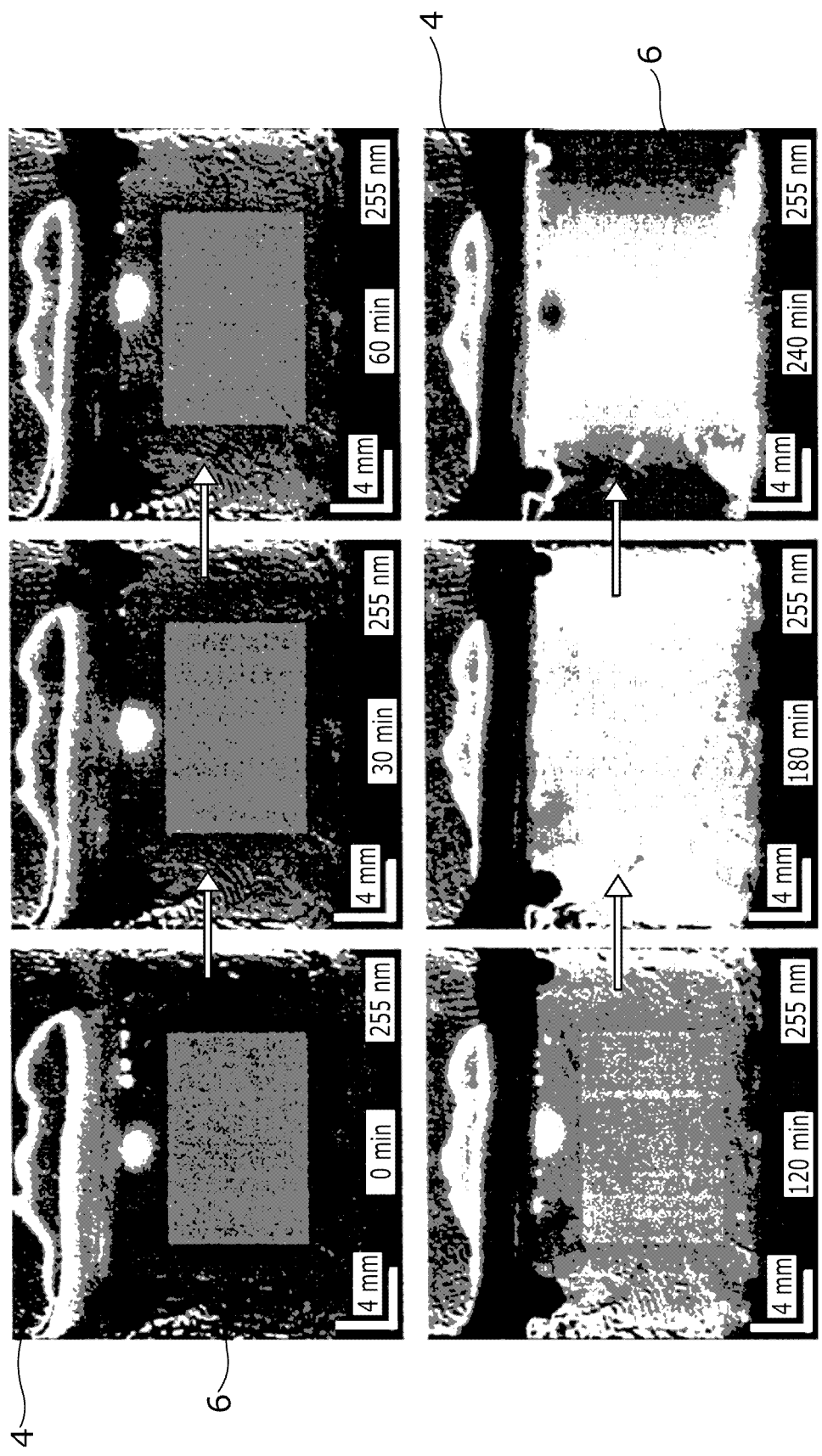
Figure 3A:
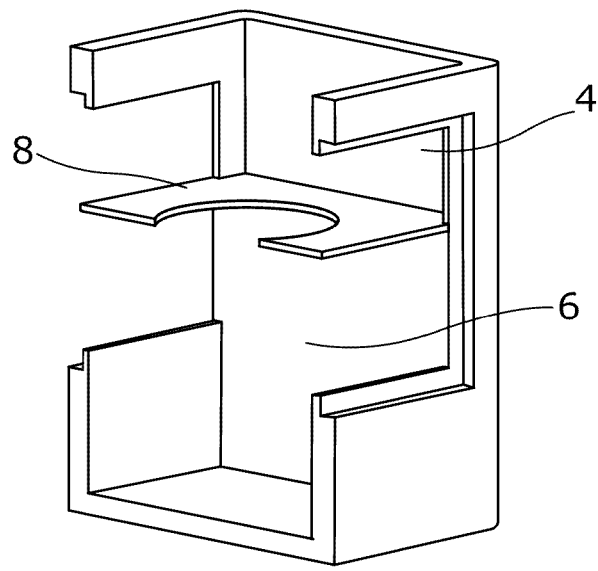
FIGS. 3a-3e show various views of a cell in accordance with one embodiment of the invention.
Figure 3C:
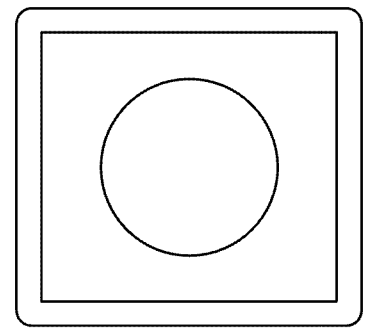
Figure 3D:
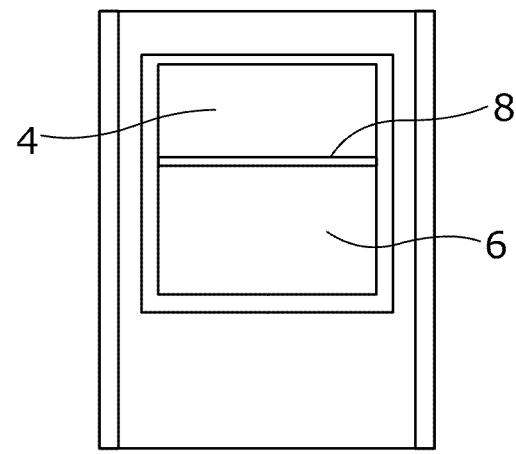
Figure 3B:
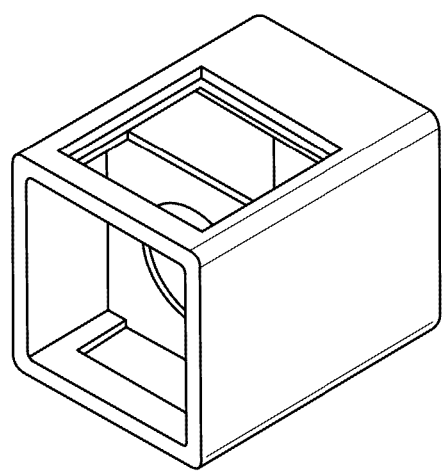
Figure 3E:
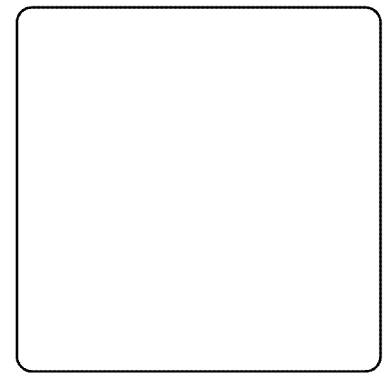

FIG. 2 shows snapshots taken at 30 minute intervals that show the permeation of Ketaprofen as the concentration increases in the lower chamber 6, this is shown by the absorbance at 255 nm. The graph plot at the top of figure, shown as FIG. 2a shows increasing absorbance over time.

Membrane Permeation Study 1

A 2.5% w/w Ketoprofen (KTP) gel formulation was used as the model topical formulation in this proof of concept study.

Prior to assessment the lower 28 mL acceptor or lower compartment 6 was filled with a phosphate buffer. Next, the silicone membrane 10 of thickness around 0.13 mm was placed on a divider between donor or upper 4 compartment and receptor compartments providing a diffusion area of 3.14 cm$^2$. A method was constructed using the data collection software to record using the 255 nm LED and the 520 nm LED for 4 hours at a temperature of 32° C.

The cell was secured in SDI2 UV imager to blank the system for setting a benchmark value for UV absorbance. After the blank, the donor compartment 4 of the cell 2 was filled with approximately 1 mL of the Ketoprofen gel administered using a 5 mL syringe. The whole assembly containing KTP gel was placed in an SDI2 UV imager such that the interface between the membrane and accepter compartment and the interface between membrane and KTP gel aligned in a straight path between UV LED and CMOS detector. This is displayed in the schematic below (FIG. 1). Once the data had been collected, the analysis software was used to extract the UV images and the absorbance data from the acceptor vessel. The raw data was processed using Microsoft Excel and the calibration curve to provide quantitative assessment of Ketoprofen diffusion (FIG. 2).

Figure 4:
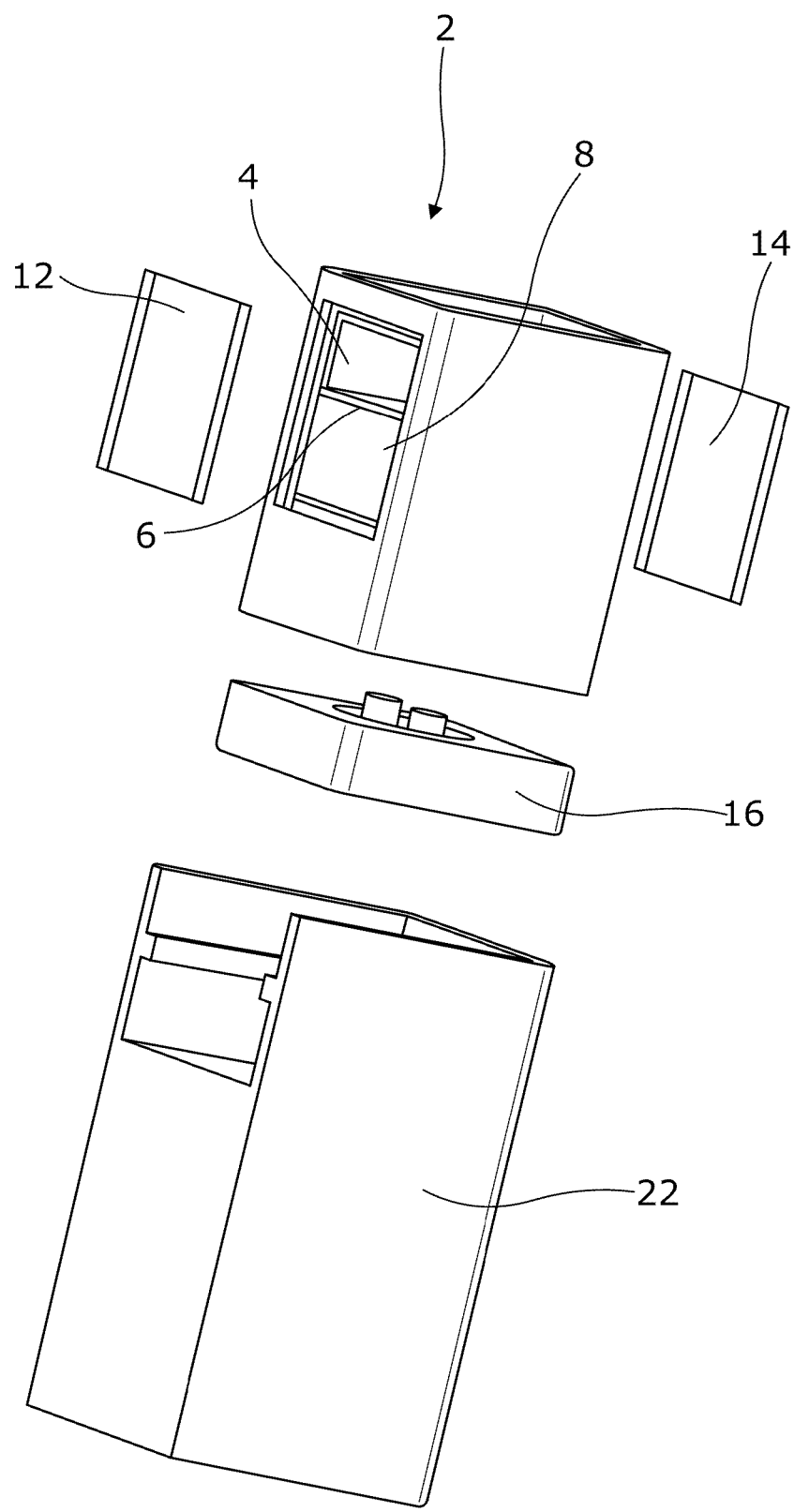
FIG. 4 shows an exploded view of a cell in accordance with one embodiment of the invention.

The structure of the cell 2 itself is shown in FIGS. 3 and 4, where the support plate 8 essentially divides the internal space defined by the outer walls into an upper chamber or donor compartment 4 and a lower chamber or acceptor compartment 6. FIG. 4 shows the placement of the front 12 and back 14 quartz windows such that both compartments and the sample can be seen in the same image. This example is also equipped with a magnetic stirrer 16 in the acceptor or lower compartment 6. Optionally the cell 2 can be placed on a stand 22 such that the cell can be optimally located between any source and detector.

FIGS. 5-8 show an example of a cell 2 analysing Ibuprofen. In these examples the cell 2 has a lid 18 through which a quartz sample tube 20 is inserted to keep the sample in place. In this example the sample tube 20 is quartz so the sample can still be imaged without interference or absorbance from the tube.

Membrane Permeation Study 2

A 5% w/w Ibuprofen (IBU) gel formulation was used as the model topical formulation in this proof of concept study.

Figures 5A, 5B:
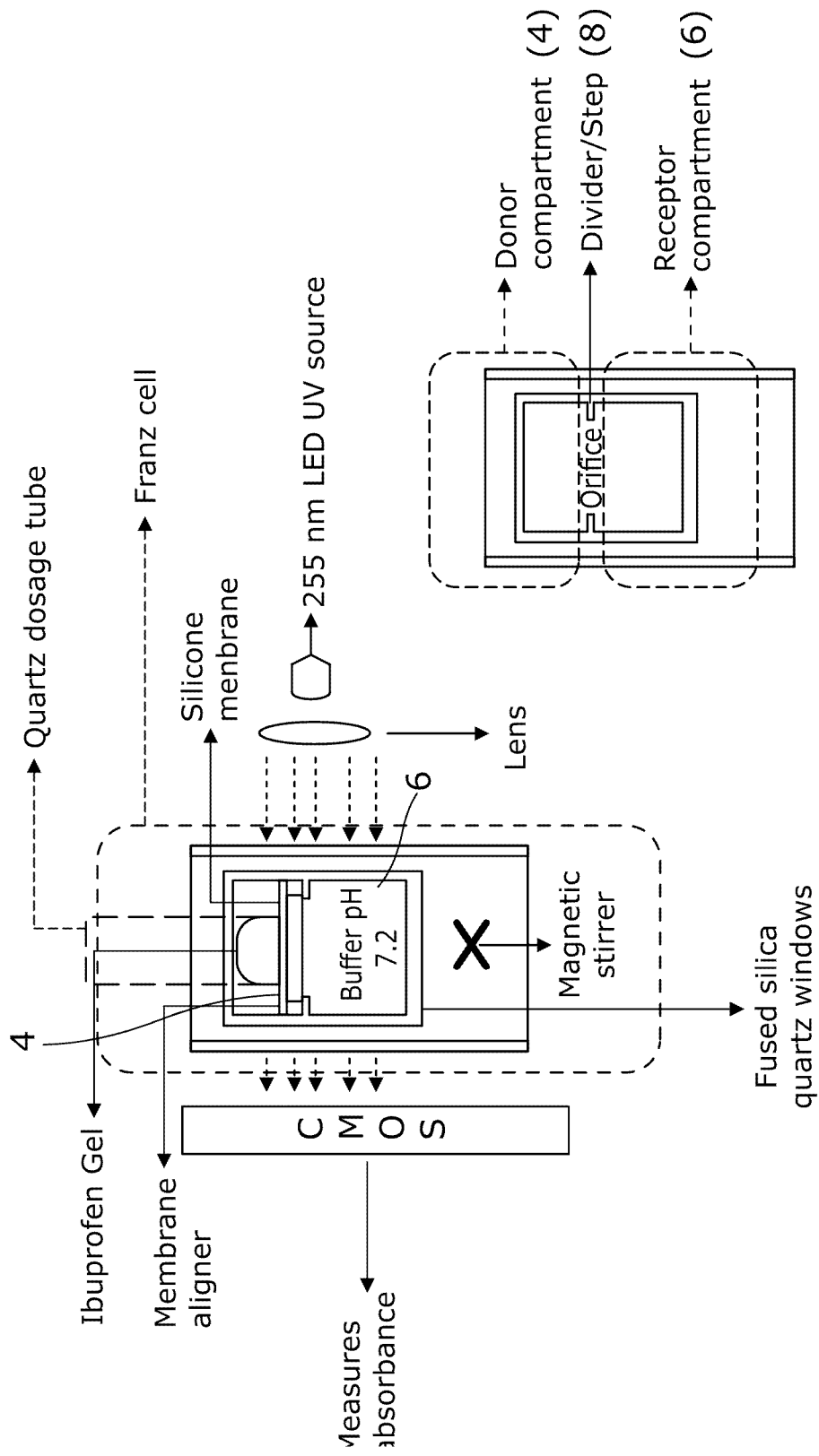
FIG. 5 shows a schematic diagram of a cell located between a UV light source and a CMOS detector.
Figure 6A:
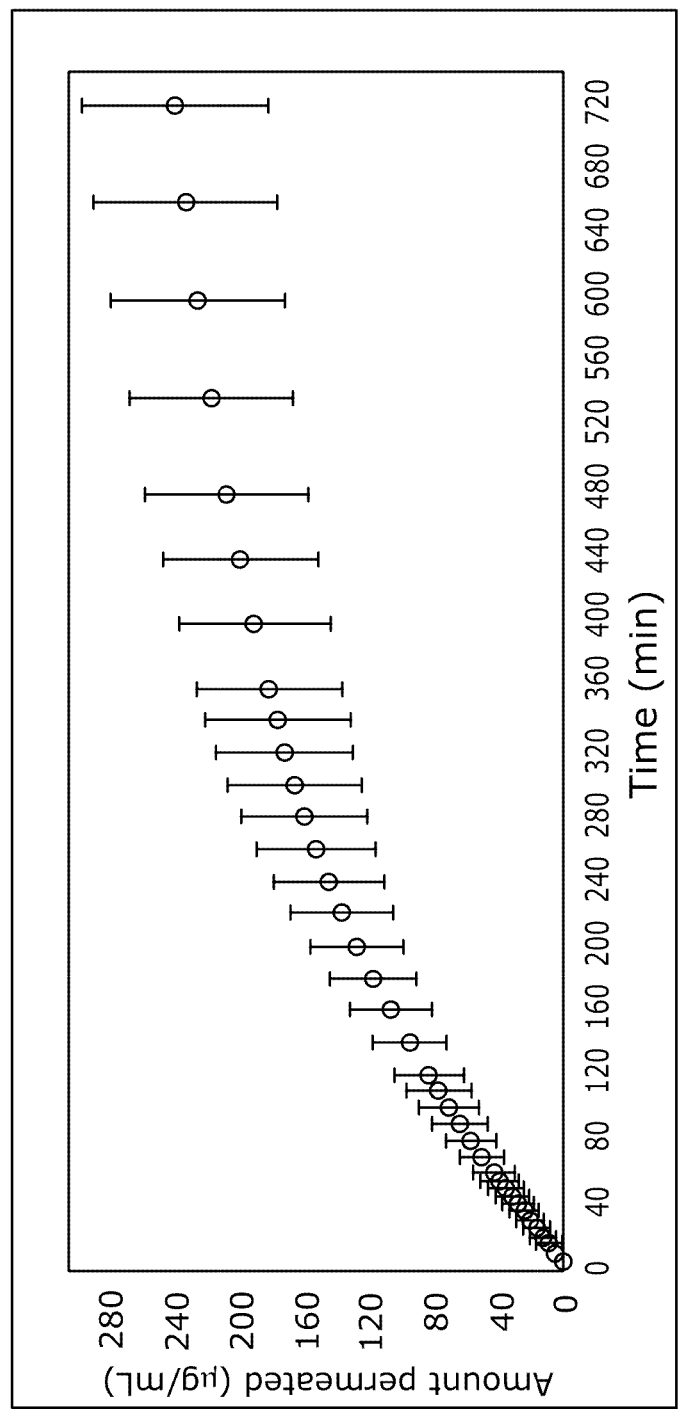
FIGS. 6a and 6b show an absorbance plot over time and absorbance images respectively using a cell in accordance with the invention.
Figure 6B:
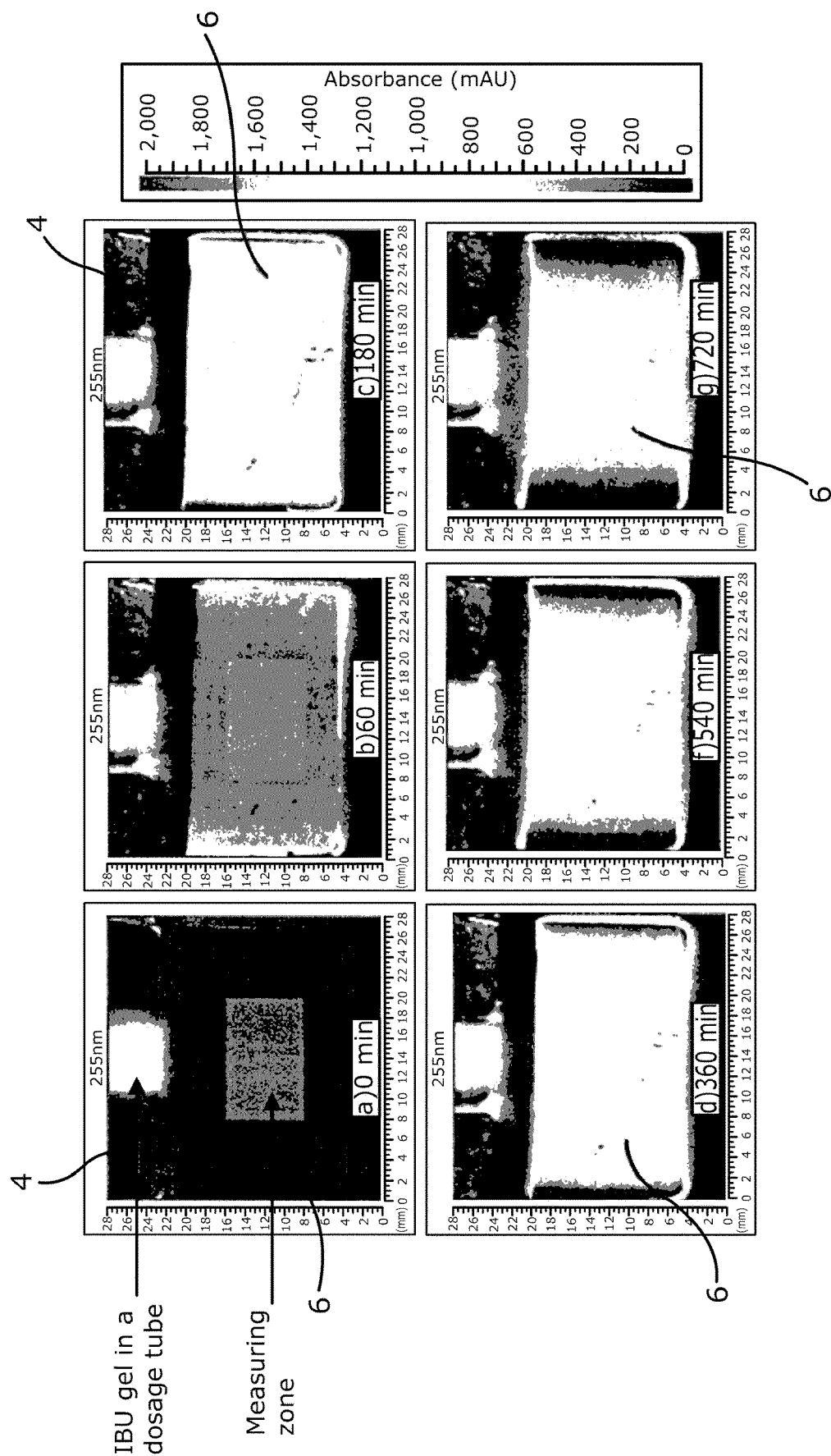
Figures 7A, 7B:
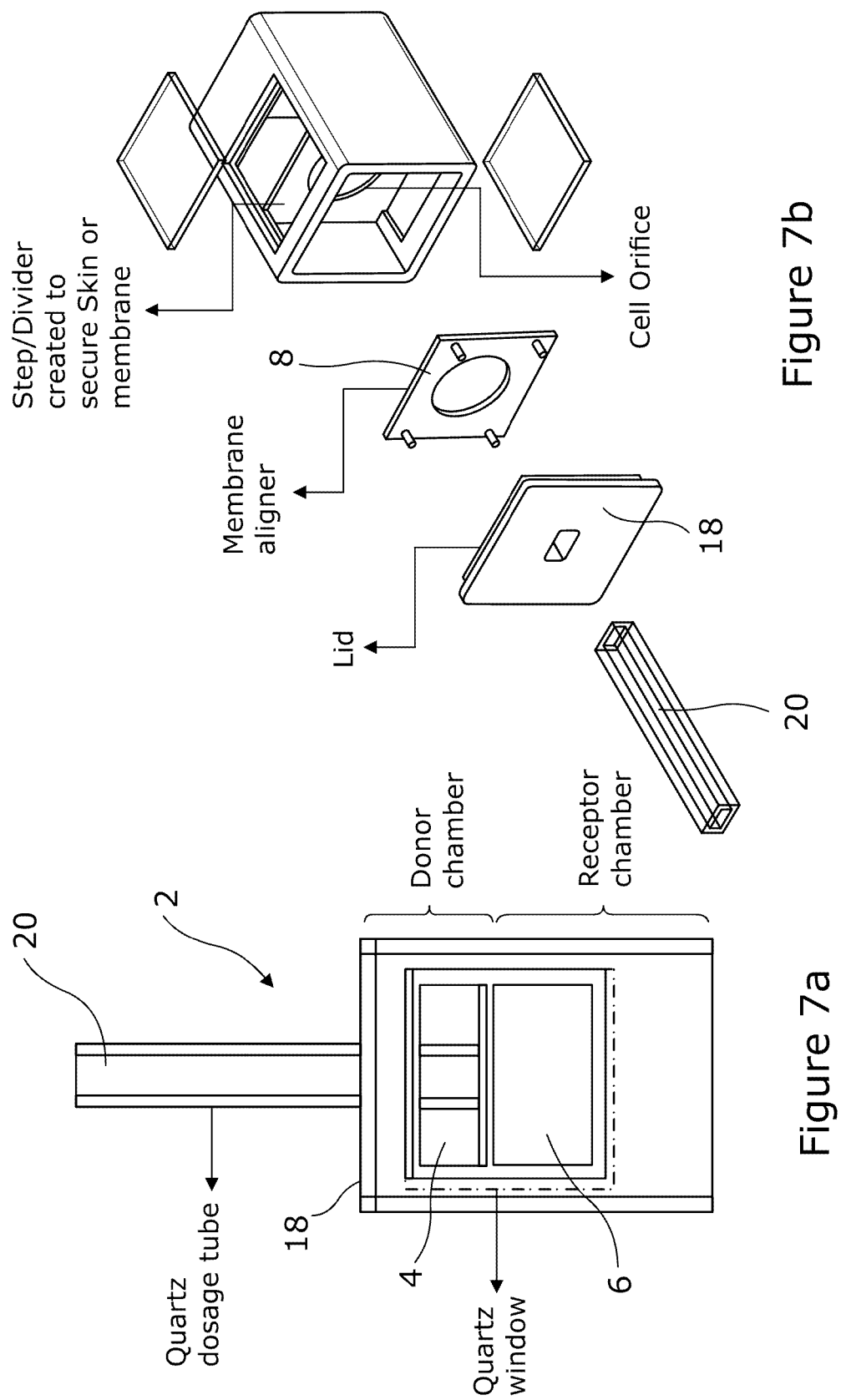
FIGS. 7a and 7b show front views and exploded isometric views respectively of a cell in accordance with an embodiment of the invention.
Figure 8B:
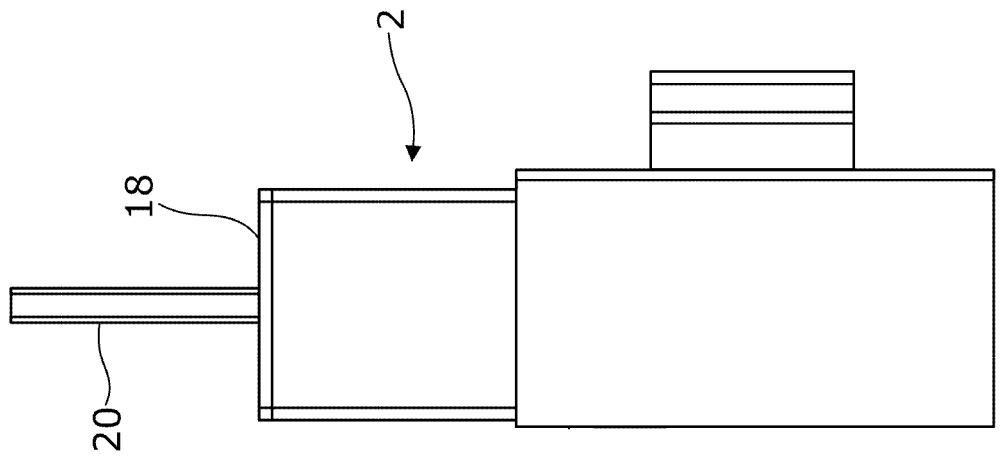
FIGS. 8a and 8b show front and side views of a cell in accordance with an embodiment of the invention.
Figure 8A:
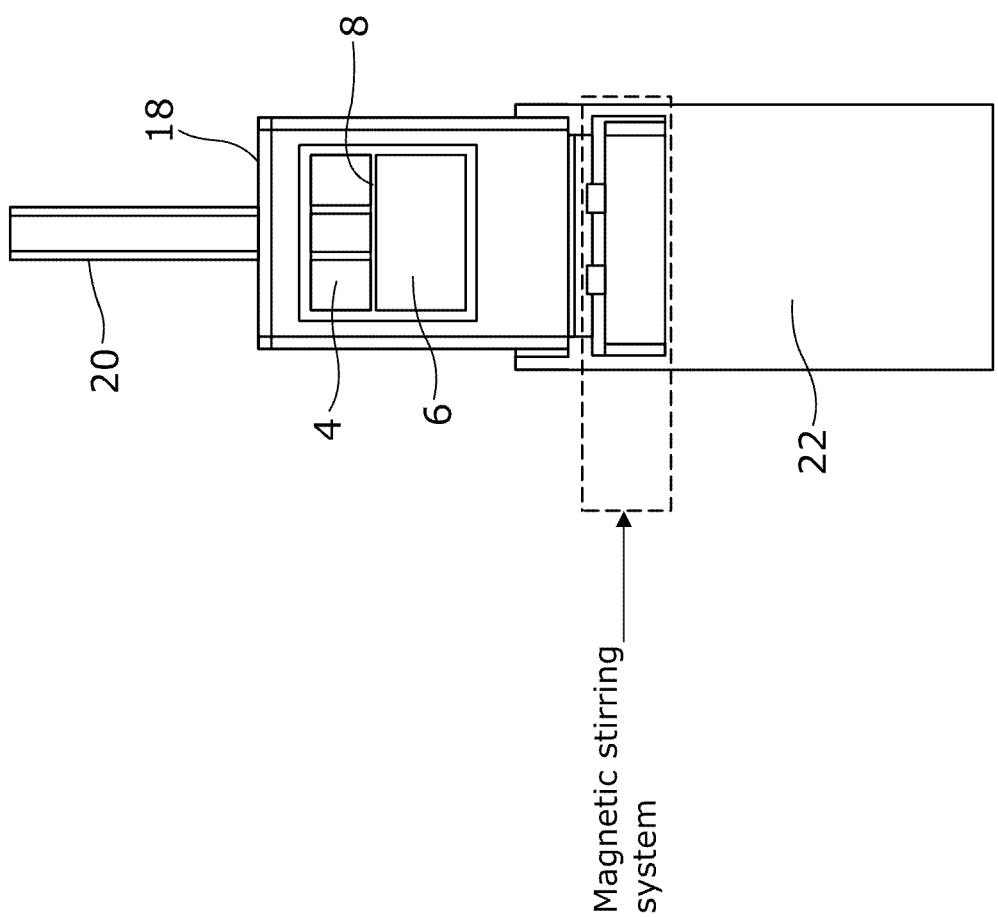

Prior to assessment the lower 30 mL receptor compartment of was filled with a phosphate buffer. Next, the silicone membrane of thickness (0.13 mm) was placed on a divider between donor and receptor compartments providing a diffusion area of 3.14 cm$^2$. A method was constructed using the data collection software to record using the 255 nm LED and the 520 nm LED for 12 hours at a temperature of 37° C. The cell was secured in SDI2 UV imager to blank the system for setting a benchmark value for UV absorbance. After the blank, the donor compartment of the cell was filled with approximately 1 mL of the Ibuprofen gel administered using a 5 mL syringe. The whole assembly containing IBU gel was placed in an SDI2 UV imager such that the interface between the membrane and receptor compartment and the interface between membrane and IBU gel aligned in a straight path between UV LED and CMOS detector. This is displayed in the schematic below (FIG. 5). Once the data had been collected, the analysis software was used to extract the UV images and the absorbance data from the receptor vessel. The raw data was processed using Microsoft Excel and the calibration curve to provide quantitative assessment of Ibuprofen diffusion (FIG. 6).

What is claimed is:

1. A system for generating a representation and measuring the permeation or diffusion of one or more substances through a membrane, the system including:
   a housing comprising:
      a first window and a second window through which ultraviolet (UV) and visible (VIS) electromagnetic radiation can pass; and
      a support mechanism, to hold a membrane in use;
   the system further comprising:
      a UV-VIS light source; and
      a UV-VIS CMOS detector;
   wherein,
      the first window and the second window are located on respective opposing walls of the housing and are parallel to each other;
      the membrane support mechanism is positioned inside the housing and transverses at a right angle the first window and the second window, such that the housing is partitioned into a first and second chamber;
      the first and second chambers are vertically aligned with the membrane located between the two in use;
      the first window and the second window being partitioned between the first and second chamber;
      the first chamber is capable of holding a fluid in use;
      the second chamber is capable of holding a substance in use;
      the UV-VIS light source is located adjacent to the first window; and
      the UV-VIS CMOS detector is located adjacent to the second window such that:
         UV-VIS electromagnetic radiation emitted from the UV-VIS light source passes in a straight path through both the first window and the second window and chambers, respectively; and
         in use, the fluid and substance held in the first and second chambers, respectively, have equal optical path lengths such that the contents of the first chamber and the contents of the second chamber can be viewed, imaged and analyzed concurrently.

2. The system according to claim 1 wherein the membrane support mechanism is a surface with one or more apertures through the same and is located substantially between the first chamber and the second chamber.

3. The system according to claim 2 wherein the first chamber forms a bottom compartment member underneath the membrane support mechanism and the second chamber forms a top compartment member and the second chamber contains the sample undergoing analysis.

4. The system according to claim 1 wherein the first chamber contains fluid or solvent.

5. The system according to claim 3 wherein at least part of the bottom compartment member includes one or more walls substantially transparent to ultraviolet (UV), visible (VIS), UV-VIS and near-infrared wavelength of electromagnetic radiation.

6. The system according to claim 5 wherein at least part of one of more walls contains the first window or the second window permitting the transmission of light at the UV and UV-VIS part of the spectrum.

7. The system according to claim 5 wherein the first window, the second window, the walls or parts thereof are transparent in one or more regions covering a spectral range from 190 nm to 1100 nm.

8. The system according to claim 1 wherein a magnetic stirrer bar is located inside the first chamber in use.

9. The system according to claim 1 wherein the system includes a member aligner used with the support mechanism to ensure the membrane is located substantially centrally in the system.

* * * * *